United States Patent
Matsui et al.

(10) Patent No.: US 11,031,584 B2
(45) Date of Patent: Jun. 8, 2021

(54) LITHIUM SECONDARY BATTERY INCLUDING LITHIUM METAL AS NEGATIVE ELECTRODE ACTIVE MATERIAL

(71) Applicant: Panasonic Intellectual Property Management Co., Ltd., Osaka (JP)

(72) Inventors: Tooru Matsui, Osaka (JP); Junichi Sakamoto, Osaka (JP); Kazuko Asano, Osaka (JP); Akira Kano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 15/963,991

(22) Filed: Apr. 26, 2018

(65) Prior Publication Data

US 2018/0337394 A1 Nov. 22, 2018

(30) Foreign Application Priority Data

May 18, 2017 (JP) .............................. JP2017-099259

(51) Int. Cl.
*H01M 4/134* (2010.01)
*H01M 10/0525* (2010.01)
(Continued)

(52) U.S. Cl.
CPC ......... *H01M 4/134* (2013.01); *H01M 4/0404* (2013.01); *H01M 4/131* (2013.01); *H01M 4/1391* (2013.01); *H01M 4/382* (2013.01); *H01M 4/463* (2013.01); *H01M 4/62* (2013.01); *H01M 10/052* (2013.01); *H01M 10/058* (2013.01); *H01M 10/0525* (2013.01);
(Continued)

(58) Field of Classification Search
None
See application file for complete search history.

(56) References Cited

U.S. PATENT DOCUMENTS

| | | | |
|---|---|---|---|
| 2006/0110661 A1* | 5/2006 | Lee | H01M 4/661 429/233 |
| 2006/0115723 A1 | 6/2006 | Ando et al. | |
| 2010/0209784 A1 | 8/2010 | Yamazaki et al. | |
| 2011/0020536 A1 | 1/2011 | Yamamoto et al. | |

(Continued)

FOREIGN PATENT DOCUMENTS

| | | |
|---|---|---|
| JP | 2-042367 | 2/1990 |
| JP | 2001-243957 | 9/2001 |

(Continued)

*Primary Examiner* — Daniel S Gatewood
(74) *Attorney, Agent, or Firm* — McDermott Will and Emery LLP

(57) ABSTRACT

A lithium secondary battery includes: a positive electrode; a negative electrode; a separator disposed between the positive electrode and the negative electrode; and a nonaqueous electrolyte solution filled between the positive electrode and the negative electrode. The negative electrode includes: an electrically conductive layer having a surface; and lithium metal pieces arranged spaced from each other on the surface of the electrically conductive layer. There is no lithium metal on an imaginary line extending from a first end to a second end opposite to the first end of the surface of the electrically conductive layer and traversing a space between the lithium metal pieces.

18 Claims, 11 Drawing Sheets

(51) Int. Cl.
  *H01M 4/46* (2006.01)
  *H01M 4/04* (2006.01)
  *H01M 4/131* (2010.01)
  *H01M 4/1391* (2010.01)
  *H01M 4/62* (2006.01)
  *H01M 10/058* (2010.01)
  *H01M 10/052* (2010.01)
  *H01M 10/42* (2006.01)
  *H01M 4/38* (2006.01)
  *H01M 4/02* (2006.01)
  *H01M 4/1395* (2010.01)

(52) U.S. Cl.
  CPC ...... *H01M 10/4235* (2013.01); *H01M 4/1395* (2013.01); *H01M 2004/027* (2013.01); *H01M 2004/028* (2013.01)

(56) References Cited

U.S. PATENT DOCUMENTS

| | | | |
|---|---|---|---|
| 2013/0122362 | A1 | 5/2013 | Sato et al. |
| 2014/0099539 | A1* | 4/2014 | Yamazaki ............. H01M 4/386 |
| | | | 429/211 |
| 2014/0304982 | A1 | 10/2014 | Morishima et al. |
| 2015/0280212 | A1 | 10/2015 | Son et al. |
| 2015/0288029 | A1* | 10/2015 | Lv ....................... H01M 2/1686 |
| | | | 429/342 |

FOREIGN PATENT DOCUMENTS

| | | |
|---|---|---|
| JP | 2006-156351 | 6/2006 |
| JP | 2010-092878 | 4/2010 |
| JP | 2010-219030 | 9/2010 |
| JP | 2016-527680 | 9/2016 |
| WO | 2004/059760 | 7/2004 |
| WO | 2012/014780 | 2/2012 |
| WO | 2013/098970 | 7/2013 |

* cited by examiner

LITHIUM SECONDARY BATTERY INCLUDING LITHIUM METAL AS NEGATIVE ELECTRODE ACTIVE MATERIAL

BACKGROUND

1. Technical Field

The present disclosure relates to a lithium secondary battery including a lithium metal as a negative electrode active material.

2. Description of the Related Art

A lithium metal has an electrical capacity of 2,062 mAh/$cm^3$ and has been expected as a negative electrode active material of a secondary battery having a high energy density. When a lithium metal is used as a negative electrode active material, the lithium metal is deposited on a negative electrode collector during charge and is then dissolved during discharge. In the case described above, because of uneven deposition of the lithium metal on the negative electrode collector, a dissolution efficiency (that is, charge/discharge efficiency) of the lithium metal is decreased. In addition, the lithium metal has a low density (0.534 g/$cm^3$). Hence, by the deposition and dissolution of the lithium metal on the negative electrode collector, the volume of the negative electrode is remarkably changed. Accordingly, the change in volume of a secondary battery using a lithium metal is also increased.

In order to suppress uneven deposition of a lithium metal and to improve the charge/discharge efficiency, Japanese Unexamined Patent Application Publication No. 2001-243957 has proposed the use of a flat negative electrode collector. According to this patent document, when a negative electrode collector having a ten-point average roughness of 10 µm or less is used, the charge/discharge efficiency is improved.

In order to absorb the change in volume of the negative electrode, Japanese Unexamined Patent Application Publication No. 2006-156351 has proposed the use of a negative electrode collector having a plurality of recesses each having, for example, a diameter of 1 µm to 3 cm and a depth of 0.1 to 300 µm. In addition, Japanese Unexamined Patent Application Publication (Translation of PCT Application) No. 2016-527680 has proposed the use of a porous negative electrode collector formed from copper or nickel having, for example, a porosity of 50% to 99% and a pore size of 5 to 500 µm.

SUMMARY

In one general aspect, the techniques disclosed here feature a lithium secondary battery comprising: a positive electrode including a positive electrode active material containing lithium; a negative electrode including an electrically conductive layer having a surface, and lithium metal pieces arranged spaced from each other on the surface of the electrically conductive layer; a separator disposed between the positive electrode and the negative electrode; and a nonaqueous electrolyte solution filled between the positive electrode and the negative electrode, the nonaqueous electrolyte solution having a lithium ion conductivity. At least one area, which is exposed from the lithium metal pieces, of the surface of the electrically conductive layer allows a lithium metal to be deposited thereon in a charged state. There is no lithium metal on an imaginary line extending from a first end to a second end opposite to the first end of the surface of the electrically conductive layer and traversing a space between the lithium metal pieces.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
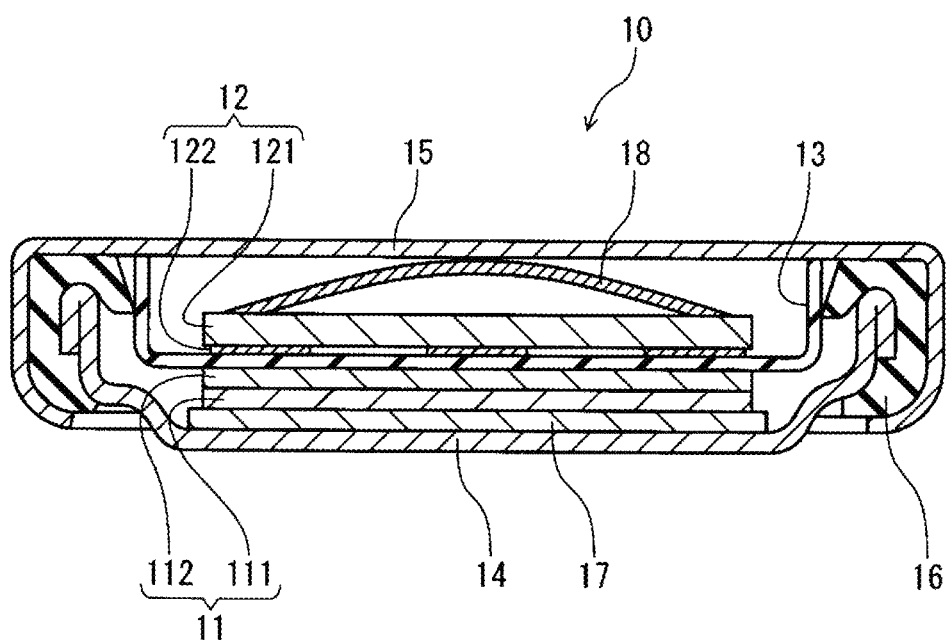
FIG. 1 is a cross-sectional view schematically showing a lithium secondary battery according to an embodiment.

A lithium secondary battery of this embodiment comprises: a positive electrode; a negative electrode facing the positive electrode; a separator disposed between the positive electrode and the negative electrode; and a nonaqueous electrolyte solution having a lithium ion conductivity. The negative electrode includes a negative electrode collector. The negative electrode collector has a facing surface facing the positive electrode. On the facing surface of the negative electrode collector, at least one projection portion is provided, and the facing surface of the negative electrode collector has a base portion on which no projection portions are arranged.

Since the projection portion is arranged on the facing surface of the negative electrode collector facing the positive electrode, a space is formed between the facing surface and the separator. During charge, a lithium metal is primarily deposited on the facing surface facing this space, that is, on the base portion of the facing surface. That is, since a lithium metal is deposited so as to be received in the space described above, the change in apparent volume of the negative electrode is suppressed.

The base portion is disposed so as to extend to at least a part of the periphery of the negative electrode collector. That is, the periphery of the negative electrode collector is not surrounded by the projection portion. Hence, a lithium metal to be deposited on the base portion can be easily brought into contact with the separator without being disturbed by the projection portion. Accordingly, the solubility of a lithium metal during discharge is improved, and a decrease in charge/discharge efficiency is suppressed. The periphery of the negative electrode collector is an outermost portion of the negative electrode collector and may also include the periphery of the facing surface.

The base portion may include a continuous region (hereinafter, referred to as "open region") in which peripheral portions of the negative electrode collector facing each other extend to each other. In other words, at least a part of the base portion may continuously extend from an arbitrary point of the periphery of the negative electrode collector to another point of the periphery thereof located at a point symmetry position with respect to the center of the negative electrode collector (facing surface) or to another point of the periphery thereof located at a line symmetry position with respect to a central line passing through the center of the facing surface. Accordingly, since the contact property between a lithium metal to be deposited and the separator is further improved, and in addition, since the electrolyte solution is able to flow (travel) on the negative electrode collector, the distribution of the electrolyte solution on the negative electrode collector becomes uniform. Hence, a lithium metal is likely to be uniformly deposited on the base portion, and even when charge/discharge is repeatedly performed, a high charge/discharge efficiency is likely to be maintained. In addition, the separator is also in contact with the surface of the projection portion and presses the surface thereof. Hence, a lithium metal is not likely to be deposited on the surface of the projection portion.

The projection portion contains a lithium metal. Although a method for forming the projection portion is not particularly limited, the projection portion may be formed from lithium metal foil (hereinafter, referred to as "lithium foil"). Since a film is liable to be formed on the surface of lithium foil, the activity thereof as a negative electrode active material is not so high. Hence, even when a charge/discharge cycle is repeatedly performed, the projection portion is likely to be maintained, and the space described above is likely to be secured. However, during discharge, a lithium metal forming the projection portion may be slightly dissolved. Hence, even when the solubility of a deposited lithium metal is decreased, a high charge/discharge efficiency is obtained. For example, after being formed into a desired shape by cutting or the like, the lithium foil is adhered to the negative electrode collector by pressure application.

The projection portion may be formed from a laminate in which a plurality of lithium foil is laminated to each other or from a laminate including lithium foil and a sheet other than the lithium foil. A material of the sheet to be laminated with the lithium foil is not particularly limited as long as the material is not allowed to react with a lithium metal. The sheet may contain, for example, an electrically conductive material which can be used for a negative electrode collector to be described later or an insulating material, such as a resin. In consideration of the solubility of lithium foil forming the projection portion, the projection portion formed from the laminate of lithium foil and a sheet other than the lithium foil may be arranged so that the lithium foil faces the facing surface of the negative electrode collector.

Although being not particularly limited, the shape and the arrangement of the projection portion are determined so that the base portion extends to at least a part of the periphery of the negative electrode collector. Accordingly, the separator is likely to be brought into contact with a lithium metal to be deposited on the base portion.

The area of the base portion with respect to the area of the facing surface may be 80% to 98%, 85% to 98%, or 90% to 98%. When the area (the area of a contact portion between the projection portion and the facing surface; and when the number of the projection portions is at least two, the area is the total area thereof) of the projection portion other than the base portion on the facing surface is 2% or more of the area of the facing surface, the separator is likely to be supported by the projection portion, and as a result, the distance between the facing surface and the separator is likely to be maintained constant. In addition, the area of the open region may be 85% to 100%, 90% to 100%, or 95% to 100% of the area of the base portion.

As the shape of the projection portion viewed along the normal line direction of the facing surface, for example, a line shape or a spot shape may be mentioned. The spot shape indicates, for example, a polygonal shape or a round shape (including an oval shape). The line shape may be a straight line, a curved line, or a combination of a straight line and a curved line. When the shape of the projection portion is a line shape, the starting point and the ending point thereof may not coincide with each other. Since the contact property of a lithium metal to be deposited and the separator is likely to be improved, the shape of the projection portion may be either a spot shape or a round shape.

The number of the projection portions is not particularly limited, and the number thereof may be either one or at least two. When the number of the projection portions is at least two, the shapes and/or the sizes of the projection portions may be either the same or different from each other.

When the number of the projection portions is at least two, a minimum distance D between the projection portions may be either 3 mm or more or 9 mm or more. Accordingly, since the separator is more likely to intrude between the projection portions, the lithium metal deposited on the base portion is more likely to be brought into contact with the separator. Furthermore, the electrolyte solution is allowed to smoothly flow on the base portion. The upper limit of the minimum distance D may be appropriately set in accordance with the size of the facing surface, the size and the height of the projection portion, and the like. The minimum distance D is the minimum distance between the peripheries of the projection portions viewed along the normal line direction of the facing surface. When the number of the projection portions is at least three, the average of the minimum distances of the peripheries of the projection portions is regarded as the minimum distance D.

The height of the projection portion may be appropriately set so as to form a space in which a lithium metal to be deposited can be received. In addition, since the separator has a compressive property, the height of the projection portion may be slightly lower than the height of the lithium metal to be deposited on the base portion during charge. However, when the height of the projection portion is excessively lower than the height of the lithium metal to be deposited, the change in apparent volume of the negative electrode is increased. On the other hand, when the height of the projection portion is excessively higher than the height of the lithium metal to be deposited, since the contact property between the separator and the lithium metal to be deposited is degraded, and the charge/discharge efficiency may be decreased in some cases. The height of the projection portion is, for example, 80% to 300% of the height of the lithium metal to be deposited on the base portion during charge. In addition, the amount of the lithium metal to be deposited depends on the electrical capacity of the positive electrode. For example, when the electrical capacity of the positive electrode is 4 to 8 mAh/cm$^2$, the height of the projection portion may be set to 15 to 120 μm.

When two positive electrodes are arranged so as to face two surfaces of the negative electrode, the projection portions are arranged on two primary surfaces of the negative electrode.

(Negative Electrode)

The negative electrode includes a negative electrode collector on which a lithium metal is deposited during charge.

The negative electrode collector is formed, for example, of an electrically conductive material other than a lithium metal and a lithium alloy. The electrically conductive material may also be a material which is not allowed to react with a lithium metal (when the electrically conductive material is a metal, an alloy and an intermetallic compound with a lithium metal are not formed). As the electrically conductive material described above, for example, there may be mentioned a metal material, such as stainless steel, nickel, copper, or iron, or graphite in which basal surfaces are preferentially exposed. In view of the strength, the electrically conductive material may be stainless steel.

The base portion of the negative electrode collector may also be smooth. Accordingly, during charge, a lithium metal derived from the positive electrodes is likely to be uniformly deposited on the base portion. The "smooth" described above indicates that a maximum height roughness Rz of the facing surface is 20 or less. The maximum height roughness Rz of the facing surface may also be 10 μm or less. The maximum height roughness Rz is measured in accordance with JIS B 0601: 2013. As the negative electrode collector described above, foil of the metal material mentioned above, a graphite sheet, or the like may be mentioned.

The thickness of the negative electrode collector is not particularly limited and may be, for example, 5 to 300 μm.

On the facing surface of the negative electrode collector, besides the projection portion, a negative electrode active material layer containing a lithium metal may also be formed. Accordingly, the charge/discharge efficiency is likely to be improved. The negative electrode active material layer may be formed over the entire facing surface. The negative electrode active material layer is formed, for example, by electrodeposition or deposition of a lithium metal. The order of formation of the negative electrode active material layer and the projection portion is not particularly limited, after the negative electrode active material layer is formed, the projection portion may be formed, or after the projection portion is formed, the negative electrode active material layer may be formed. The thickness of the negative electrode active material layer is also not particularly limited and may be, for example, 30 to 300 μm.

(Positive Electrode)

The positive electrode is obtained, for example, by forming a disc shape from a positive electrode mixture which is a mixture of a positive electrode active material, an electrically conductive material, and a binder. Alternatively, the positive electrode is obtained by holding a layer (positive electrode mixture layer) containing the positive electrode mixture on a positive electrode collector. As the positive electrode collector, for example, stainless steel, aluminum, or titanium may be used. The positive electrode mixture layer may be held on the positive electrode collector in such a way that a slurry formed by mixing the positive electrode mixture and a liquid component is applied on the surface of the positive electrode collector and is then dried. The thickness of the positive electrode collector is not particularly limited and may be, for example, 5 to 300 μm. The thickness of the positive electrode mixture layer is also not particularly limited and may be, for example, 30 to 300 μm.

As long as being capable of occluding and releasing lithium, the positive electrode active material is not particularly limited. As the positive electrode active material, for example, there may be mentioned a lithium-manganese composite oxide (such as $LiMn_2O_4$), a lithium-nickel composite oxide (such as $LiNiO_2$), a lithium-cobalt composite oxide (such as $LiCoO_2$), a lithium-iron composite oxide (such as $LiFeO_2$), a lithium-nickel-cobalt-manganese composite oxide (such as $LiNi_{0.5}Co_{0.2}Mn_{0.3}O_2$, $LiNi_{1/3}Co_{1/3}Mn_{1/3}O_2$, or $LiNi_{0.4}Co_{0.2}Mn_{0.4}O_2$), a lithium-nickel-cobalt-aluminum composite oxide (such as $LiNi_{0.8}Co_{0.15}Al_{0.05}O_2$, or $LiNi_{0.8}Co_{0.18}Al_{0.02}O_2$), a lithium-nickel-manganese composite oxide (such as $LiNi_{0.5}Mn_{0.5}O_2$), a lithium-nickel-cobalt composite oxide (such as $LiNi_{0.8}Co_{0.2}O_2$), a lithium-transition metal phosphoric acid compound (such as $LiFePO_4$), or a lithium-transition metal sulfuric acid compound (such as $Li_xFe_2(SO_4)_3$). Since the energy density is likely to be increased, as the positive electrode active material, a lithium-cobalt composite oxide, a lithium-nickel-cobalt-manganese composite oxide, or a lithium-nickel-cobalt-aluminum composite oxide may be used.

As the electrically conductive material, for example, there may be mentioned natural graphite, man-made graphite, carbon black, or carbon fibers. As the carbon black, for example, there may be mentioned acetylene black, Ketjen black, channel black, furnace black, lamp black, or thermal black. Those materials may be used alone, or at least two types thereof may be used in combination. The amount of the electrically conductive material contained in the positive electrode mixture with respect to 100 parts by mass of the positive electrode active material is, for example, 5 to 30 parts by mass.

As the binder, for example, there may be mentioned an olefin resin, such as a polyethylene or a polypropylene; a fluorine-containing resin, such as a polytetrafluoroethylene (PTFE), a poly(vinylidene fluoride), a tetrafluoroethylene-hexafluoropropylene copolymer, or a vinylidene fluoride-hexafluoropropylene copolymer; a styrene-butadiene rubber, a fluorine-containing rubber, or a poly(meth)acrylic acid. Those compounds may be used alone, or at least two types thereof may be used in combination. The amount of the binder contained in the positive electrode mixture with respect to 100 parts by mass of the positive electrode active material is, for example, 3 to 15 parts by mass.

(Separator)

As the separator, for example, there may be mentioned a porous film containing a polyolefin, a three-dimensional regular array porous film containing a polyimide, or a non-woven cloth formed from a material similar to that mentioned above. In addition, the separator may also be a sheet formed by fixing fine particles of an inorganic compound, such as aluminum oxide, with a binder. Those compounds may be used alone, or at least two types thereof may be used in combination. The thickness of the separator is not particularly limited and is, for example, 5 to 200 μm.

(Nonaqueous Electrolyte Solution)

As the nonaqueous electrolyte solution, a known material which has a lithium ion conductivity and which has been used for a lithium secondary battery may be mentioned by way of example. The nonaqueous electrolyte solution contains, for example, an electrolyte salt and a nonaqueous solvent.

As the electrolyte salt, for example, there may be mentioned $LiPF_6$, $LiBF_4$, $LiN(SO_2F)_2$, $LiN(SO_2CF_3)_2$, or $LiBF_2(C_2O_4)$.

Although the nonaqueous solvent is not particularly limited, for example, there may be mentioned a cyclic carbonate, a chain carbonate, a cyclic carboxylic acid ester, a cyclic sulfone, a cyclic ether, or a chain ether. As the cyclic carbonate, for example, there may be mentioned propylene carbonate or ethylene carbonate. As the chain carbonate, for example, there may be mentioned diethyl carbonate, ethyl methyl carbonate (EMC), or dimethyl carbonate (DMC). As the cyclic carboxylic acid ester, for example, there may be mentioned γ-butyrolactone or γ-valerolactone. As the cyclic sulfone, for example, there may be mentioned sulfolane or methylsulfolane. As the cyclic ether, for example, there may be mentioned 1,3-dioxolane. As the chain ether, for example, there may be mentioned 1,2-dimethoxyethane or 1,2-diethoxyethane.

Since the charge/discharge efficiency is improved, the nonaqueous solvent may also be a fluorine-containing cyclic carbonate. As the fluorine-containing cyclic carbonate, for example, there may be mentioned fluoroethylene carbonate (FEC), difluoroethylene carbonate, or trifluoroethylene carbonate. In addition, since the distribution of the electrolyte solution on the negative electrode collector is likely to become uniform, the nonaqueous solvent may be a chain carbonate and may be DMC and/or EMC.

In particular, the nonaqueous solvent may also be a mixed solvent containing a fluorine-containing cyclic carbonate and a chain carbonate. The electrolyte solution contains, for example, a nonaqueous solvent, such as FEC or FEC further mixed with DMC, and an electrolyte salt, such as $LiPF_6$ or $LiN(SO_2F)_2$. In this case, FEC and DMC may be mixed together so as to satisfy FEC/DMC=0.1/0.9 to 1/0 (molar ratio). $LiPF_6$ or $LiN(SO_2F)_2$ may be dissolved so as to satisfy electrolyte salt/nonaqueous solvent=1/2 to 1/20 (molar ratio).

FIG. 1 is a cross-sectional view schematically showing a coin-type lithium secondary battery according to this embodiment. However, the shape of the lithium secondary battery is not limited thereto. Depending on the application of the battery, besides the coin type, the shape of the lithium secondary battery may be appropriately selected from various shapes, such as a cylindrical type, a square type, a sheet type, a flat type, and a laminate type.

A coin-type lithium secondary battery 10 includes a positive electrode 11, a negative electrode 12, and a separator 13 disposed therebetween. In addition, the positive electrode 11, the negative electrode 12, and the separator 13 are in contact with a nonaqueous electrolyte not shown in the figure.

A positive electrode case 14 is a member receiving the positive electrode 11 and the separator 13 and also functions as a positive electrode collector and a positive electrode terminal. The positive electrode case 14 also functions as a sealing plate of the coin-type battery. As a material forming the positive electrode case 14, various materials known in a lithium secondary battery field may be mentioned. In particular, for example, titanium or stainless steel may be mentioned.

The positive electrode 11 includes a positive electrode collector 111 and a positive electrode mixture layer 112. The positive electrode mixture layer 112 faces the separator 13. The positive electrode collector 111 faces the positive electrode case 14 with an electrically conductive spacer 17 interposed therebetween. In addition, the positive electrode collector 111 is electrically connected to the positive electrode case 14 with the spacer 17 interposed therebetween. A material of the spacer 17 is not particularly limited as long as having an electrical conductivity, and for example, a material similar to that of the positive electrode case 14 may be mentioned.

A negative electrode case 15 is a member which is electrically connected to the negative electrode 12 and which functions as a negative electrode terminal. As a material forming the negative electrode case 15, various materials known in the lithium secondary battery field may be mentioned. In particular, for example, iron, titanium, or stainless steel may be mentioned.

The negative electrode 12 includes a negative electrode collector 121, and on a facing surface 12X (for example, see FIG. 2A) facing the positive electrode 11, at least one projection portion 122 is arranged. Between the negative electrode case 15 and the negative electrode 12, a disc spring 18 is disposed. The negative electrode 12 is pressed toward a positive electrode 11 side by the disc spring 18. In addition, the negative electrode 12 is electrically connected to the negative electrode case 15 with the disc spring 18 interposed therebetween. A material of the disc spring 18 is not particularly limited as long as having an electrical conductivity, and for example, a material similar to that of the negative electrode case 15 may be mentioned.

Between the positive electrode case 14 and the negative electrode case 15, a gasket 16 is disposed. By the presence of the gasket 16, the positive electrode case 14 and the negative electrode case 15 are insulated from each other. As a material forming the gasket 16, for example, a synthetic resin, such as a polypropylene, a poly(phenylene sulfide), or a poly(ether ether ketone), may be mentioned. A material forming the gasket 16 may be, for example, a polypropylene.

Hereinafter, with reference to the drawings, variations of the projection portion to be arranged on the negative electrode collector will be described. FIGS. 2A to 5 are each a top view schematically showing a negative electrode according to one of the following embodiments. In each embodiment, the entire area of the base portion is an open region. However, the shape of the projection portion and the arrangement thereof are not limited to those shown in each embodiment. In addition, for the convenience of illustration, in the example shown in each figure, the base portion is hatched, and the flow of the electrolyte solution is partially shown by an arrow F.

First Embodiment

Figure 2A:
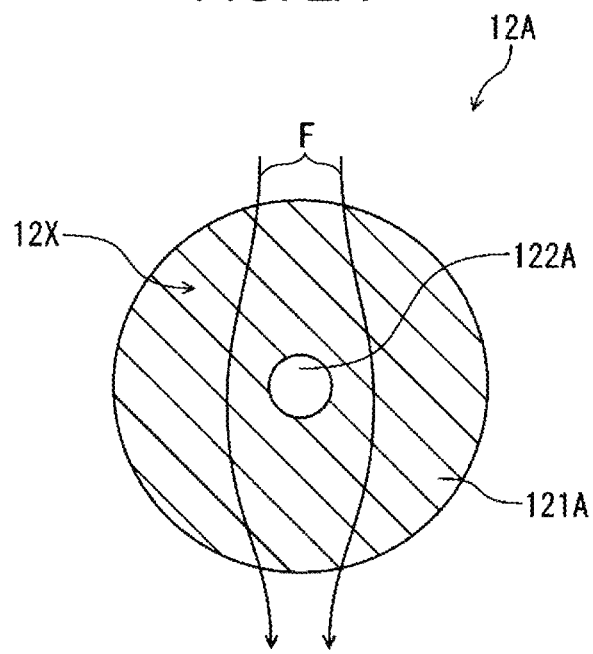
FIG. 2A is a top view schematically showing a negative electrode according to a first embodiment.
Figure 2B:
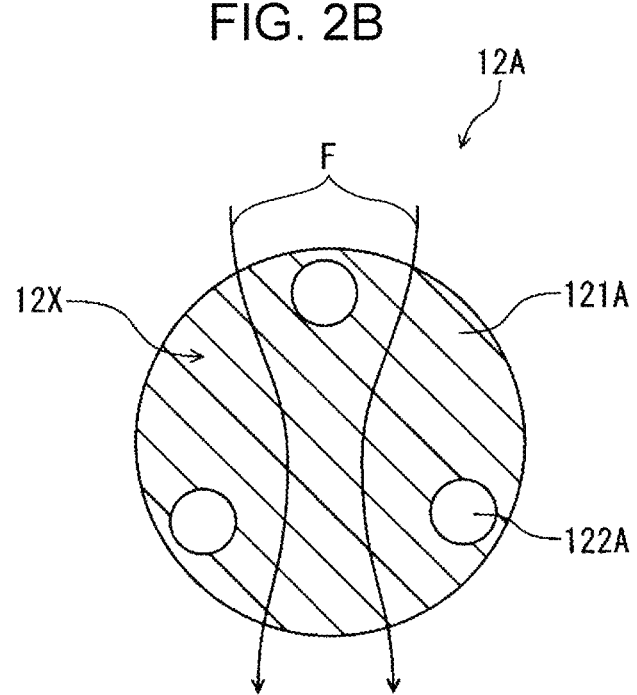
FIG. 2B is a top view schematically showing another negative electrode according to the first embodiment.
Figure 2C:
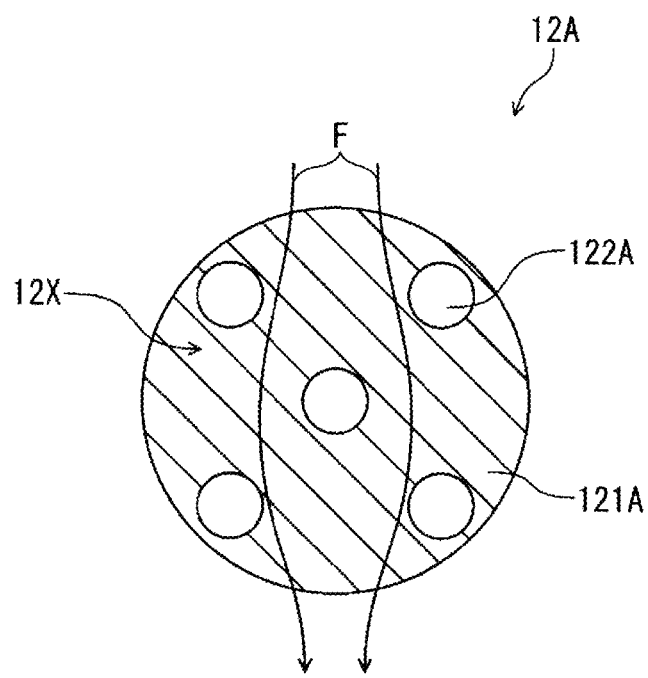
FIG. 2C is a top view schematically showing still another negative electrode according to the first embodiment.

A negative electrode 12A of a first embodiment includes, as shown in FIGS. 2A to 2C, a round negative electrode collector 121A. On a facing-surface side of the negative electrode collector 121A, at least one projection portion 122A is provided. The negative electrode 12A as described above is used, for example, for a coin-type lithium secondary battery.

The projection portion 122A has a spot shape (approximately round shape), and the area of the base portion is 80% to 98% of the area of the facing surface 12X. The projection portion 122A may also have a polygonal shape. When a plurality of the projection portions 122A is arranged, the shapes and the sizes of the projection portions 122A may be either the same or may be different from each other.

The projection portion 122A is formed, for example, from a small lithium foil piece. The small piece as described above may be formed, for example, by cutting of lithium foil using scissors or the like or by punching of lithium foil using a punching die or the like. The projection portion 122A is formed in such a way that the small lithium foil piece thus obtained is arranged at a desired position of the facing surface 12X of the negative electrode collector 121A and is then pressed thereon with a protective sheet (such as a polyethylene sheet) interposed therebetween. A lithium metal is soft. Hence, when the small lithium foil piece is pressed, while being extended by 2 to 4 times in size, the small lithium foil piece is easily adhered to the facing surface 12X.

A maximum length R of the projection portion 122A is 7% to 23% of the maximum length of the facing surface 12X. When one projection portion 122A as described above is arranged, as shown in FIG. 2A, this projection portion 122A may be arranged at the center of the facing surface 12X. Since the distance between the facing surface 12X and the separator 13 is likely to be maintained constant, and the space formed therebetween is likely to be maintained, the number of the projection portions 122A may be either at least two or at least three. The upper limit of the number of the projection portions 122A to be arranged is not particularly limited.

When the projection portions 122A are arranged, the arrangement thereof is performed so as to increase the minimum distance between the projection portions 122A. Accordingly, the uniformity of current distribution viewed from the positive electrode can be maintained. The projection portions 122A may be arranged either in a line symmetrical manner with respect to a center line passing through the center of the facing surface 12X or in a point symmetrical manner with respect to the center of the facing surface 12X. Accordingly, the distance between the facing surface 12X and the separator 13 is likely to be maintained constant. For example, when three projection portions 122A are arranged, as shown in FIG. 2B, the projection portions 122A are arranged in the vicinity of the periphery of the facing surface 12X at regular intervals. In this case, the three projection portions 122A each form an apex of a regular triangle. When five projection portions 122A are arranged, for example, as shown in FIG. 2C, one projection portion is arranged at the center of the facing surface 12X, and the remaining four projection portions are arranged in the vicinity of the periphery of the facing surface 12X at regular intervals.

When the projection portion 122A is viewed along the normal line direction of the facing surface, the maximum length R of the projection portion 122A having a spot shape is the maximum length of a straight line drawn from an arbitrary point of the periphery of the projection portion to a point of the periphery thereof opposite to the arbitrary point through the center of the projection portion. When the number of the projection portions 122A is at least two, the average of the maximum lengths of the projection portions is regarded as the maximum length R. As is the case described above, when the facing surface 12X is viewed along the normal line direction thereof, the maximum length of the round facing surface 12X is the maximum length of a straight line drawn from an arbitrary point of the periphery of the facing surface 12X to a point of the periphery thereof opposite to the arbitrary point through the center of the facing surface 12X.

Second Embodiment

Figure 3A:
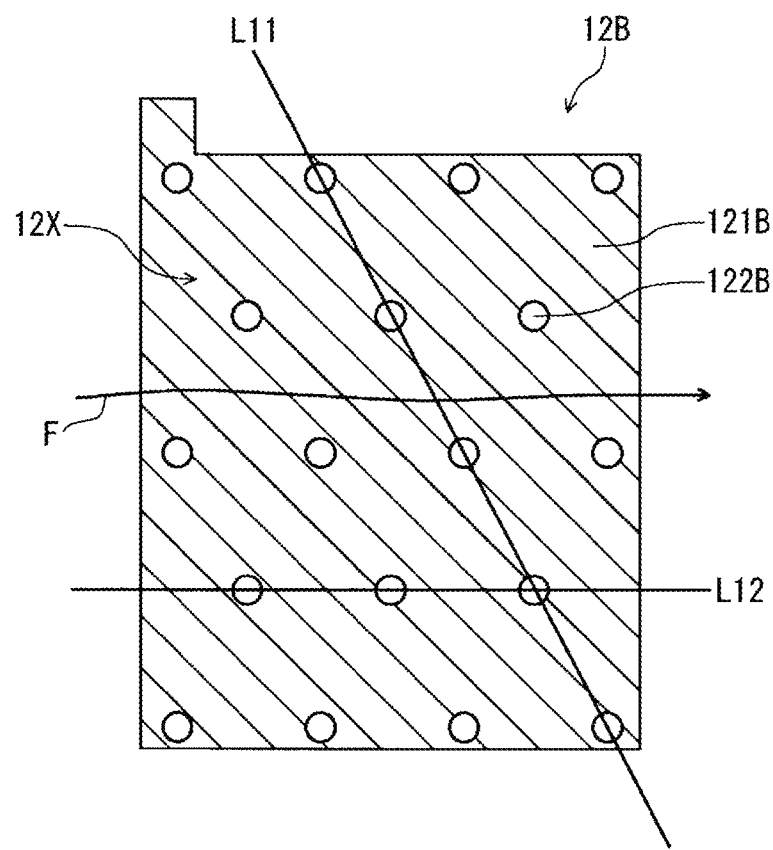
FIG. 3A is a top view schematically showing a negative electrode according to a second embodiment.
Figure 3B:
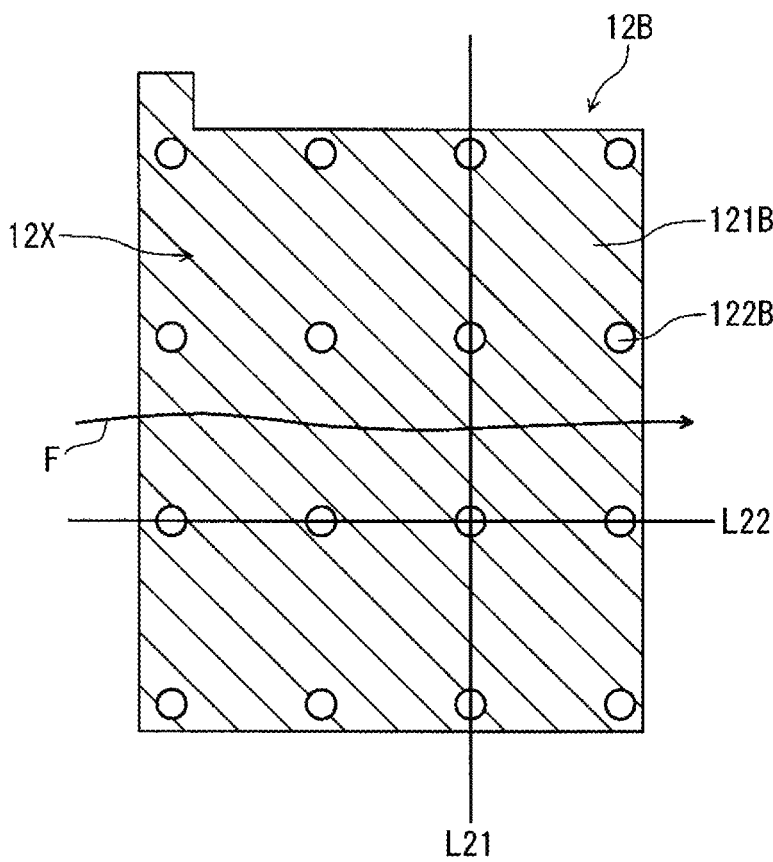
FIG. 3B is a top view schematically showing another negative electrode according to the second embodiment.

As shown in FIGS. 3A and 3B, except for that a negative electrode 12B of a second embodiment includes an approximately rectangular negative electrode collector 121B and that a plurality of projection portions 122B are provided on a facing-surface side of the negative electrode collector 121B, the negative electrode 12B of the second embodiment is similar to the negative electrode 12A of the first embodiment. The negative electrode 12B as described above is used, for example, for a sheet-type or a laminate-type lithium secondary battery. The projection portions 122B each have a spot shape (approximately round shape), and the area of the base portion is 80% to 98% of the area of the facing surface 12X.

The maximum length R of the projection portion 122B is 2% to less than 7% of the maximum length of the facing surface 12X. The projection portions 122B as described above may be arranged over the entire facing surface 12X. As shown in FIG. 3A, for example, the projection portions 122B are arranged at regular intervals along a line L11 and a line L12 intersecting each other at an angle of less than 90°. Alternatively, for example, as shown in FIG. 3B, the projection portions 122B are arranged at regular intervals along a line L21 and a line L22 intersecting each other at an angle of 90°. The number of the projection portions 122B to be arranged is not particularly limited.

When the facing surface is viewed along the normal line direction thereof, the maximum length of the rectangular facing surface is the maximum length of a straight line drawn from an arbitrary point of the periphery of the facing surface to a point of the periphery thereof opposite to the arbitrary point through the center of the facing surface. However, as shown in the figure by way of example, when the negative electrode collector has a tab portion, the maximum length of the facing surface is calculated excluding the tab portion.

When two positive electrodes are disposed to face two surfaces of the negative electrode 12B, the projection portions 122B are arranged on two primary surfaces of the negative electrode 12B.

Third Embodiment

Figure 4:
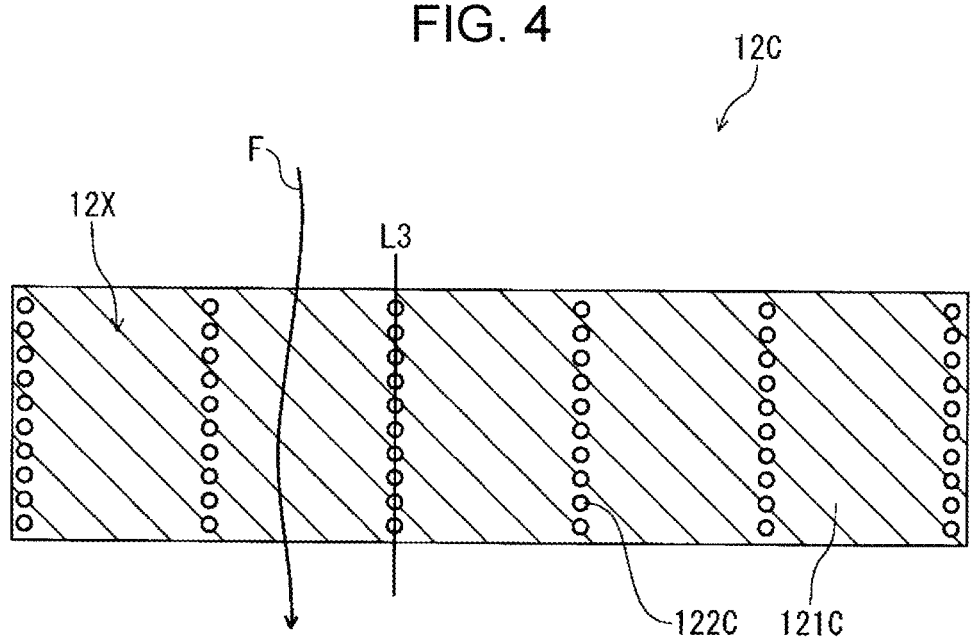
FIG. 4 is a top view schematically showing a negative electrode according to a third embodiment.

As shown in FIG. 4, except for that a negative electrode 12C of a third embodiment includes a long rectangular negative electrode collector 121C and that a plurality of projection portions 122C are provided on a facing-surface side of the negative electrode collector 121C, the negative electrode 12C of the third embodiment is similar to the negative electrode 12A of the first embodiment. The negative electrode 12C as described above is wound and is used, for example, for a cylindrical-type or a square-type lithium secondary battery. The projection portions 122C each have a spot shape (approximately round shape), and the area of the base portion is 80% to 98% of the area of the facing surface 12X.

The maximum length R of the projection portion 122C is 0.05% to less than 2% of the maximum length of the facing surface 12X. The projection portions 122C as described above may be arranged to form a line shape along a direction intersecting a long-side direction of the facing surface 12X (perpendicular thereto in the example shown in the figure). The number of lines L3 each formed by the projection portions 122C may be at least two. Accordingly, when the negative electrode collector 121C is wound along the long-side direction thereof, the distance between the facing surface 12X and the separator 13 is likely to be maintained constant, and the space formed therebetween is likely to be maintained. The lines L3 may be arranged not in parallel to each other but are arranged so as not to be intersected to each other.

In the case described above, the minimum distance D between the projection portions 122C arranged on the same line L3 may be smaller than 3 mm. The reason for this is that the electrolyte solution is able to flow on the facing surface 12X along the line L3. On the other hand, a minimum distance DL between the lines L3 may be either 3 mm or more or 9 mm or more. The reason for this is that the line L3 formed by the projection portions 122C can be regarded as one projection portion. In addition, when adjacent lines L3 are not in parallel to each other, the minimum distance DL is the minimum distance on the facing surface 12X between an arbitrary point on one line L3 and an arbitrary point on the other line L3 (hereinafter, the minimum distance DL is defined as described above).

Fourth Embodiment

Figure 5:
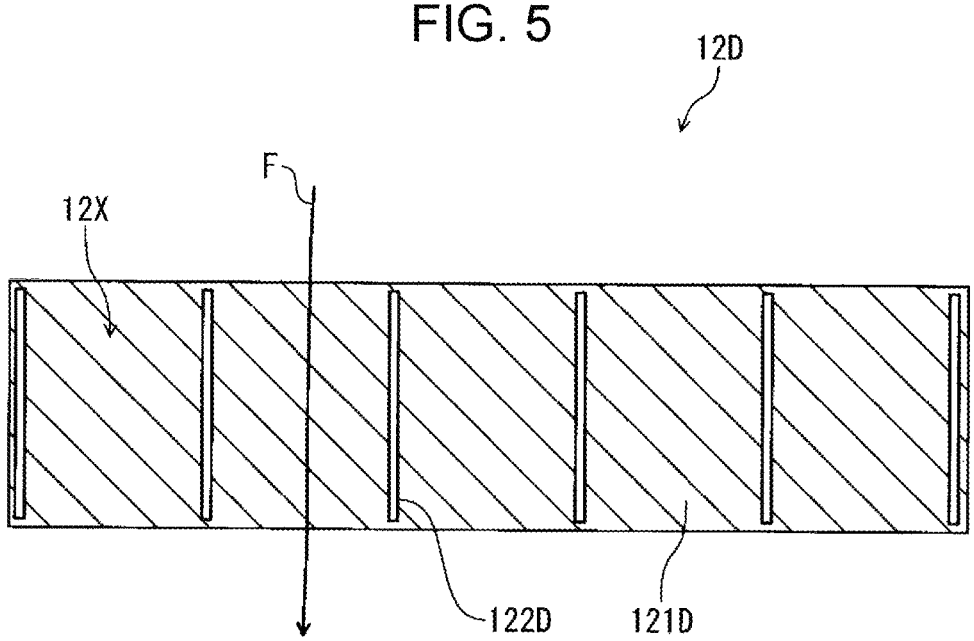
FIG. 5 is a top view schematically showing a negative electrode according to a fourth embodiment.

As shown in FIG. 5, except for that a negative electrode 12D of a fourth embodiment includes a long rectangular negative electrode collector 121D and that projection portions 122D are provided on a facing-surface side of the negative electrode collector 121D, the negative electrode 12D of the fourth embodiment is similar to the negative electrode 12A of the first embodiment. The negative electrode 12D as described above is wound and is used, for example, for a cylindrical-type or a square-type lithium secondary battery. The projection portions 122D each have a line shape, and the area of the base portion is 80% to 98% of the area of the facing surface 12X.

An external form of the projection portion 122D is not particularly limited and may be, for example, a straight line shape or may include a curved line. However, the external form may not be required to be a loop shape in which the starting point and the ending point coincide with each other. In addition, the widths of the projection portion 122D in a short-side direction and a long-side direction each may be either constant or not constant.

A line-shape projection portion 122D may be arranged in a direction intersecting a long-side direction of the facing surface 12X (perpendicular thereto in the example shown in the figure). In this case, the length of the projection portion 122D in a long-side direction thereof may be 50% to 100% of the length of the facing surface 12X in a short-side direction thereof. The length of the projection portion 122D in a short-side direction thereof may be appropriately set so that the area of the base portion is 80% to 98% of the area of the facing surface 12X.

The number of the projection portions 122D to be arranged may be at least two. Accordingly, when the negative electrode collector 121D is wound along the long-side direction thereof, the distance between the facing surface 12X and the separator 13 is likely to be maintained constant, and the space formed therebetween is likely to be maintained. The projection portions 122D may be arranged not in parallel to each other but are arranged not to be intersected to each other. The minimum distance D between the projection portions 122D may be either 3 mm or more or 9 mm or more.

When the projection portion 122D is viewed along the normal line direction of the facing surface, the length of the projection portion in the long-side direction thereof is the maximum length between two sides of the projection portion 122D along the short-side direction thereof. When the number of the projection portions 122D is at least two, the average of the lengths of the projection portions in the long-side direction is regarded as the length thereof in the long-side direction. As is the case described above, when the projection portion 122D is viewed along the normal line direction of the facing surface, the length of the projection portion 122D in the short-side direction thereof is the maximum length between two sides of the projection portion 122D along the long-side direction thereof. When the number of the projection portions 122D is at least two, the average of the lengths of the projection portions in the short-side direction thereof is regarded as the length thereof in the short-side direction.

Hereinafter, various examples will be described in detail. However, the present disclosure is not limited to the following examples.

Example 1

(1) Formation of Negative Electrode

A punching die having a punching diameter of 1 mm was pressed to lithium foil (thickness: 300 μm, manufactured by The Honjo Chemical Corporation) to form a small lithium metal piece. The small piece thus obtained was placed on the center of a primary surface (facing surface) of stainless steel foil (negative electrode collector, maximum height roughness Rz: approximately 10 μm, manufactured by Hirai Seimitsu Kogyo Corporation) having a diameter of 15 mm and a thickness of 300 μm and was then pressed thereon with a polyethylene sheet (manufactured by Seisannipponnsha Ltd.) interposed therebetween by a flat portion of the punching die. While being extended to have a diameter of approximately 2.4 mm, the small piece was adhered to the stainless steel foil. As described above, a negative electrode having a round projection portion having a height of approximately 60 μm was obtained. The entire area of the base portion of the negative electrode collector was an open region. The area of the base portion was approximately 97% of the area of the facing surface.

(2) Formation of Coin-Type Lithium Secondary Battery (Half Cell)

Figure 6:
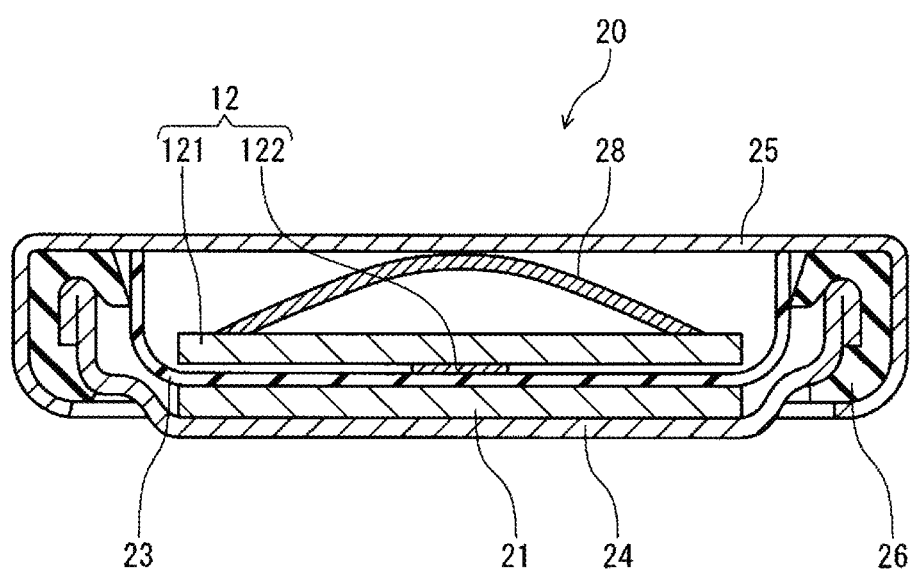
FIG. 6 is a cross-sectional view schematically showing a half cell formed in Example 1.

As described below, a half cell 20 (diameter: 20 mm, thickness: 1.6 mm) shown in FIG. 6 was assembled. In addition, (1) the formation of the negative electrode and (2) the formation of the half cell were performed in dry air at a dew point of approximately −60° C.

After lithium foil (diameter: 15 mm, thickness: 300 μm) used as a counter electrode 21 was adhered to a cap 24 (formed of stainless steel), 40 μL of an electrolyte solution containing $LiPF_6$/FEC/DMC=1/5/5 (molar ratio) was dripped. Subsequently, a separator 23 (polyimide resin-made three-dimensional regular array porous film, diameter: 17.6 mm) was disposed on the counter electrode 21, and furthermore, 40 μL of the electrolyte solution described above was dripped. After the negative electrode 12 obtained in the (1) was disposed on the above film, a disc spring 28 (formed of stainless steel) and a negative electrode case 25 (formed of stainless steel) were placed. Finally, the negative electrode case 25 was swaged over the cap 24 with a gasket 26 interposed therebetween for sealing, so that the half cell 20 was obtained.

In addition, $LiPF_6$ of the electrolyte solution was manufactured by Stella Chemifa Corporation, FEC was manufactured by Kishida Chemical Co., Ltd., and DMC was manufactured by Mitsubishi Chemical Corporation. The disc spring 28 was manufactured by Tokuhatsu Co., Ltd., and the cap 24, the case 25, and the gasket 26 were manufactured by PT PANASONIC GOBEL INDONESIA.

[Evaluation 1]

Figure 7:
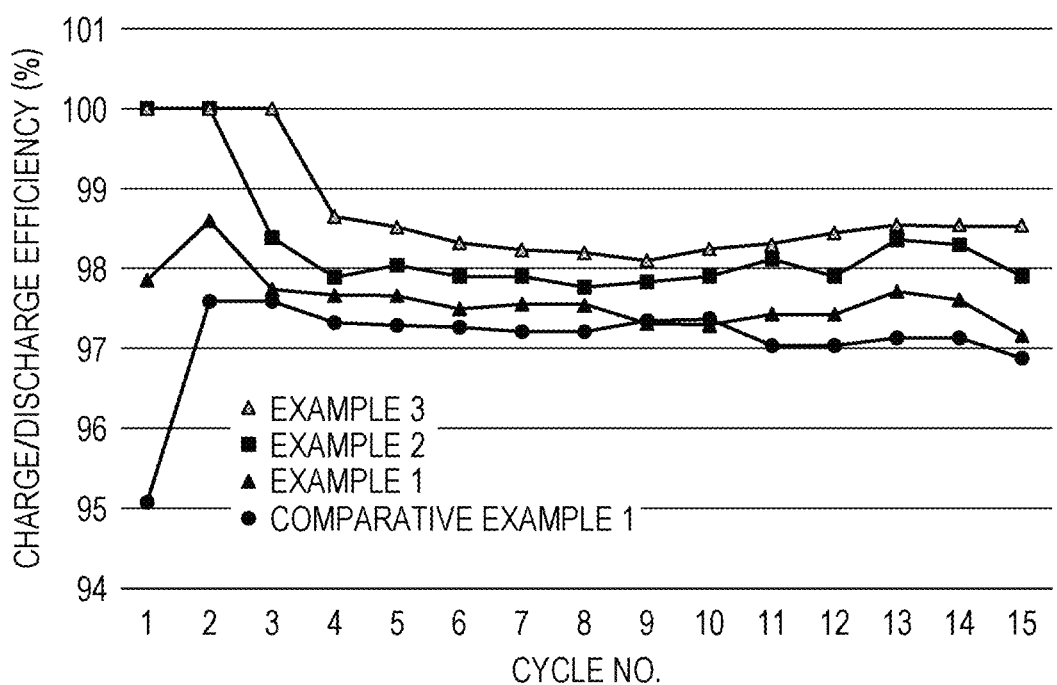
FIG. 7 is a graph obtained by plotting the charge/discharge efficiency at each cycle of each of Examples 1 to 3 and Comparative Example 1.

By the use of the half cell, a charge/discharge efficiency at 25° C. with respect to the negative electrode collector was obtained. Charge was performed at a current density of 3.75 $mA/cm^2$ for a charge time of 2 hours, and discharge was performed at a current density of 3.75 $mA/cm^2$. The current density was calculated based on the area (1.77 $cm^2$) obtained when the negative electrode was viewed along the normal line direction of the facing surface of the negative electrode collector. The discharge was finished when the voltage of the half cell reached 1 V or the discharge was performed for 2 hours. Under the conditions as described above, the charge/discharge cycle was repeatedly performed 15 times. The results are shown in FIG. 7.

Example 2

Except for that three small lithium foil pieces were adhered to a facing surface of stainless steel foil, a negative electrode having three round projection portions and a half cell were formed in a manner similar to that of Example 1 and were then evaluated. The results are shown in FIG. 7. In addition, the three small pieces were arranged as shown in FIG. 2B. The entire area of the base portion of the negative electrode collector was an open region. The minimum distance D between the projection portions was 8.5 mm, and the area of the base portion was approximately 92% of the area of the facing surface.

Example 3

Except for that five small lithium foil pieces were adhered to a facing surface of stainless steel foil, a negative electrode having five round projection portions and a half cell were formed in a manner similar to that of Example 1 and were then evaluated. The results are shown in FIG. 7. In addition, the five small pieces were arranged as shown in FIG. 2C. The entire area of the base portion of the negative electrode collector was an open region. The minimum distance D between the projection portions was 3.9 mm, and the area of the base portion was approximately 86% of the area of the facing surface.

Comparative Example 1

Except for that a negative electrode including no small lithium metal pieces was used, a half cell was formed in a manner similar to that of Example 1 and was then evaluated. The results are shown in FIG. 7.

As apparent from the graph shown in FIG. 7, the half cells of Examples 1 to 3 each have a high charge/discharge efficiency as compared to that of the half cell of Comparative Example 1 having no projection portions. This charge/discharge efficiency is improved as the number of the projection portions containing a lithium metal is increased. The reason for this is believed that in the half cells of Examples 1 to 3, since the distance between the facing surface of the negative electrode collector and the separator is maintained constant, a lithium metal is likely to be uniformly deposited on the negative electrode collector. In addition, the charge/discharge efficiency of the half cell of each of the Examples 1 to 3 becomes approximately constant from a fourth cycle. This result indicates that although the charge/discharge cycle was repeatedly performed, the distance between the facing surface of the negative electrode collector and the separator was maintained constant. In addition, during initial some cycles of each of Examples 2 and 3, the charge/discharge efficiency was 100%. The reason for this is believed that during discharge, the lithium metal contained in the projection portion was slightly dissolved.

Hereinafter, it was confirmed that when a lithium metal was deposited over the entire facing surface so as to smooth the facing surface, the charge/discharge efficiency was decreased.

Comparative Example 2

Figure 8:
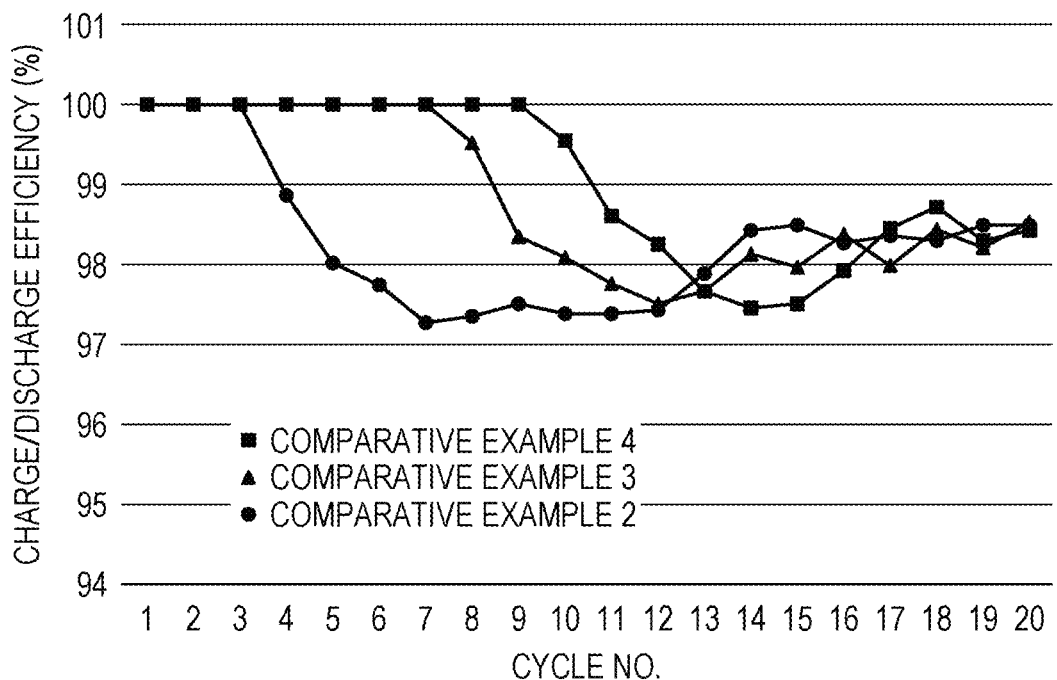
FIG. 8 is a graph obtained by plotting the charge/discharge efficiency at each cycle of each of Comparative Examples 2 to 4.

Except for that a negative electrode in which a lithium metal was electrodeposited at an electrical capacity of 1.5 mAh over the entire facing surface of a negative electrode collector was used, a half cell was formed in a manner similar to that of Example 1 and was then evaluated. The thickness of a lithium metal layer formed by the electrodeposition was approximately 4 μm. The results are shown in FIG. 8.

Comparative Example 3

Except for that the electrical capacity was set to 3.0 mAh, a half cell was formed in a manner similar to that of Comparative Example 2 and was then evaluated. The thickness of a lithium metal layer formed by the electrodeposition was approximately 8 μm. The results are shown in FIG. 8.

Comparative Example 4

Except for that the electrical capacity was set to 4.5 mAh, a half cell was formed in a manner similar to that of Comparative Example 2 and was then evaluated. The thickness of a lithium metal layer formed by the electrodeposition was approximately 12 The results are shown in FIG. 8.

As apparent from the graph shown in FIG. 8, the charge/discharge efficiencies of Comparative Examples 2, 3, and 4, in each of which no projection portions were formed, were seriously decreased from a third cycle, a seventh cycle, and a ninth cycle, respectively. Subsequently, although being again increased, the charge/discharge efficiency was not stabilized. The reason for this is believed that by the deposition and the dissolution of a lithium metal, the change in volume of the negative electrode is increased. Furthermore, by the deposition and the dissolution of a lithium metal, since the shape of a lithium metal on the negative electrode is changed, the contact property between the separator and the lithium metal is degraded, and in addition, the distribution of the electrolyte solution becomes uneven on the negative electrode collector.

In addition, in Comparative Examples 2 to 4, the lithium metal layer is formed by an electrodeposition method. Hence, the lithium metal layer has a high activity as the negative electrode active material. Accordingly, although the number of cycles at which a charge/discharge efficiency of 100% is obtained is increased, the change in shape of the lithium metal itself is increased by charge/discharge, and as a result, the deposition thereof becomes uneven. Hence, the projection portion containing a lithium metal may be formed by a method (such as adhesion of lithium foil) other than a method, such as electrodeposition, in which a lithium metal having a high activity is formed.

Hereinafter, it was confirmed whether a lithium metal to be deposited by charge is received in the space formed between the base portion and the separator or not.

Example 4

Figure 9:
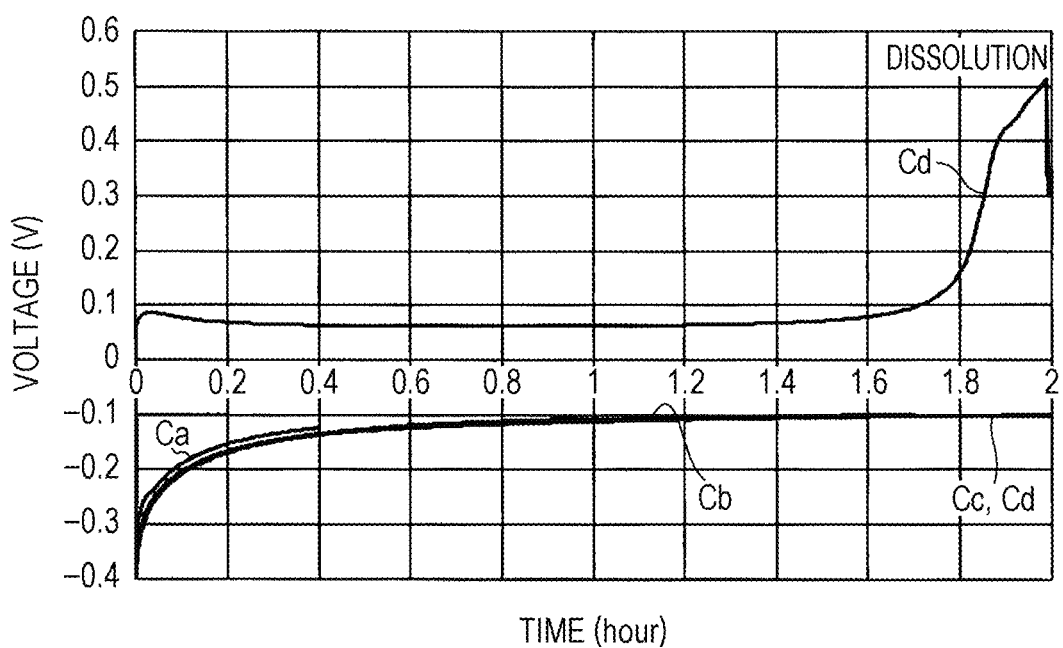
FIG. 9 is a graph showing charge curves and a discharge curve of Example 4.

Four negative electrodes Na to Nd and four half cells Ca to Cd were formed in manner similar to that of Example 3. Each half cell was charged at a current density of 3.75 mA/cm$^2$, and a lithium metal was deposited so that the negative electrode Na had a electrical capacity of 1.5 mAh/cm$^2$ (charge time: 0.4 hours), the negative electrode Nb had a electrical capacity of 4.5 mAh/cm$^2$ (charge time: 1.2 hours), and the negative electrodes Nc and Nd each had a electrical capacity of 7.5 mAh/cm$^2$ (charge time: 2 hours). The half cell Cd which was charged for 2 hours was discharged at the same current density for 2 hours, so that the lithium metal thus deposited was dissolved. In FIG. 9, the charge curve and the discharge curve of each half cell are shown. It is found that the half cells were each stably charged and/or discharged.

Figure 10A:
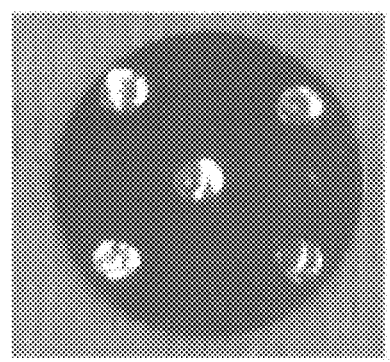
FIG. 10A is a view showing an image of a negative electrode formed in Example 4 taken along the normal line direction of a facing surface.
Figure 10B:
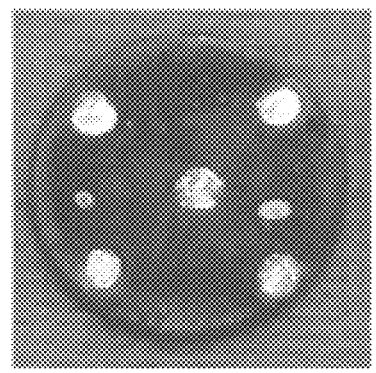
FIG. 10B is a view showing an image of a charged negative electrode formed in Example 4 taken along the normal line direction of the facing surface.

After the charge and/or the discharge was completed, the half cells were each disassembled, and the negative electrodes were recovered. In FIGS. 10B to 10E, images of the recovered negative electrodes Na to Nd each taken along the normal line direction of the facing surface (surface facing the counter electrode) are shown. FIG. 10B corresponds to the charged negative electrode Na, and FIG. 10O corresponds to the charged negative electrode Nb. FIG. 10D corresponds to the charged negative electrode Nc, and FIG. 10E corresponds to the discharged negative electrode Nd. In addition, FIG. 10A is an image of the negative electrode Na before charged.

On the base portion of the negative electrode Na on which a lithium metal was deposited to have an electrical capacity of 1.5 mAh/cm$^2$, the base stainless steel foil was observed at two positions, and a region not covered with the lithium metal was present. On the other hand, on the base portion of the negative electrode Nb on which a lithium metal was deposited to have an electrical capacity of 4.5 mAh/cm$^2$, no base stainless steel foil was observed, and the base portion was fully covered with the lithium metal. However, in every negative electrode, the periphery of the projection portion was apparently observed. That is, it is found that without covering the projection portions, the lithium metal thus deposited was received in the space formed between the base portion of the negative electrode collector and the separator.

As described above, on the projection portion facing the counter electrode 21, no lithium metal was deposited. This indicates that the electrical conductivity of the projection portion was degraded. Hence, it is believed that during discharge, the lithium metal contained in the projection portion is not likely to be dissolved, and the deposited lithium metal is preferentially dissolved. Hence, even when the charge/discharge cycle was repeatedly performed, the shape of the projection portion is maintained, and the space formed between the facing surface of the negative electrode collector and the separator is maintained. Although the reason the electrical conductivity of the projection portion is degraded has not been clearly understood, it is believed that by the influences of manufacturing process environments, materials to be used, and the like, a film is formed on the surface of the projection portion, so that the projection portion is passivated.

Figure 10C:
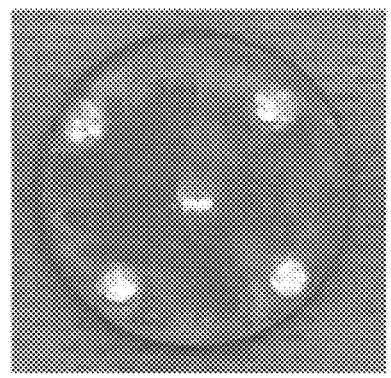
FIG. 10C is a view showing an image of charged another negative electrode formed in Example 4 taken along the normal line direction of a facing surface.
Figure 10D:
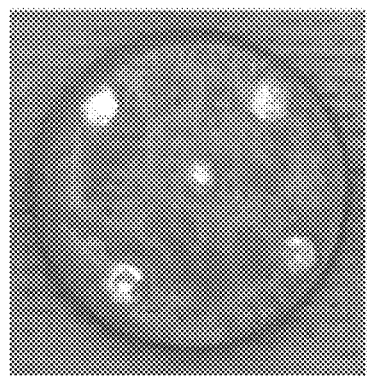
FIG. 10D is a view showing an image of charged still another negative electrode formed in Example 4 taken along the normal line direction of a facing surface.
Figure 10E:
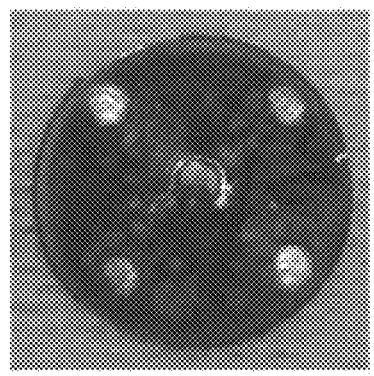
FIG. 10E is a view showing an image of discharged still another negative electrode formed in Example 4 taken along the normal line direction of a facing surface.

In addition, as apparent from FIGS. 10B, 10C, and 10D, as the amount of the lithium metal thus deposited was increased, the deposited lithium metal showed a silver-gray color. This color indicates that the surface of the deposited lithium metal facing the separator is smooth. That is, the color indicates that the lithium metal is uniformly deposited on the base portion of the negative electrode collector, and most of the lithium metal was brought into contact with the separator and pressed thereto. Hence, during discharge, the lithium metal thus deposited is likely to be dissolved, and hence, the charge/discharge efficiency is increased.

Example 5

By the use of a positive electrode formed as described below and the negative electrode formed in Example 2, a coin-type lithium secondary battery as shown in FIG. 1 was formed. In addition, the height (approximately 60 μm) of the projection portion is 270% of the height of a lithium meal to be deposited on the base portion from a theoretical point of view.

(1) Formation of Positive Electrode

LiNi$_{0.8}$Co$_{0.18}$Al$_{0.02}$O$_2$ (positive electrode active material (NCA)), acetylene black (AB), and a poly(vinylidene fluoride) (PVDF) were dispersed in N-methyl-2-pyrrolidone to satisfy NCA/AB/PVDF=98/1/1 (weight ratio), so that a slurry was obtained. After the slurry thus obtained was applied to one surface of aluminum foil (positive electrode collector), drying was performed at 105° C., so that a positive electrode mixture layer was formed. Subsequently, a laminate of the aluminum foil and the positive electrode mixture layer thus obtained was rolled and then punched out to have a disc shape having a diameter of 15 mm, so that a positive electrode was obtained. The positive electrode was formed to have an electrical capacity of 4.5 mAh/cm$^2$.

(2) Formation of Coin-Type Lithium Secondary Battery

As described below, a coin-type lithium secondary battery (diameter: 20 mm, thickness: 1.6 mm) as shown in FIG. 1 was assembled. In addition, the assembly of the coin-type lithium secondary battery was performed in dry air at a dew point of approximately −60° C.

Stainless steel foil (spacer) having a diameter of 16 mm and a thickness of 300 μm was resistance-welded to a positive electrode case. After the positive electrode formed in the above (1) was disposed on the spacer so that the positive electrode collector faced the spacer, 40 μL of an electrolyte solution containing LiPF$_6$/FEC/DMC=1/5/5 (molar ratio) was dripped. A separator (polyimide-made three-dimensional regular array porous film, diameter: 17.6 mm) was disposed on the positive electrode, and 40 μL of the above electrolyte solution was further dripped. After the negative electrode was disposed on the above film, a disc spring (made of stainless steel) and a negative electrode case (made of stainless steel) were placed. Finally, the negative electrode case was swaged over the positive electrode case with a gasket interposed therebetween for sealing, so that a coin-type lithium secondary battery was obtained.

[Evaluation 2]

The charge/discharge cycle was repeatedly performed on the coin-type lithium secondary battery, and a discharge capacity retention rate was obtained from the discharge capacity at each cycle.

The charge/discharge was performed at 25° C., at a current density of 0.9 mA/cm$^2$, and in a voltage range of 2.5 to 4.3 V. The current density was calculated based on the area (1.77 cm$^2$) of the negative electrode obtained when being viewed along the normal line direction of the primary surface of the negative electrode collector. Under the conditions as described above, the charge/discharge cycle was repeatedly performed 10 times, and the discharge capacity at each cycle was measured. The discharge capacity at a first cycle was regarded as 100%, and at each cycle from a second cycle, the discharge capacity retention rate was obtained. The results are shown in FIG. 11.

Comparative Example 5

Except for that a negative electrode including no small lithium metal pieces was used, a coin-type lithium secondary battery was formed in a manner similar to that of Example 5 and was then evaluated. The results are shown in FIG. 11.

Figure 11:
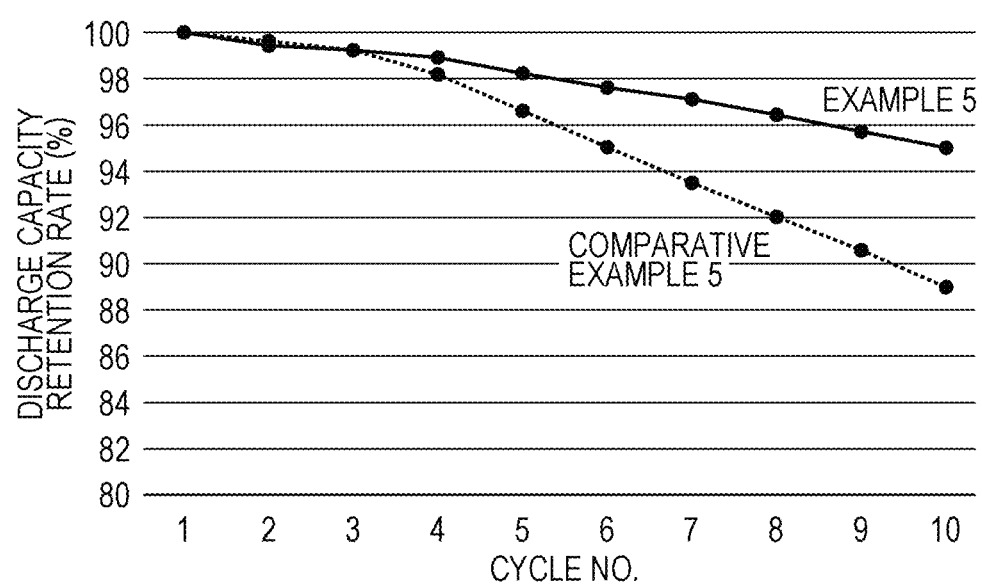
FIG. 11 is a graph obtained by plotting a discharge capacity retention rate at each cycle of a coin-type lithium secondary battery formed in each of Example 5 and Comparative Example 5.

As apparent from the graph shown in FIG. 11, when the projection portions are provided, the cycle characteristics are improved. The reason for this is that since the lithium metal is uniformly deposited on the negative electrode collector by the projection portions, the charge/discharge efficiency is maintained at a high value.

What is claimed is:

1. A lithium secondary battery comprising:
    a positive electrode including a positive electrode active material containing lithium;
    a negative electrode including:
        a negative electrode current collector having a surface, wherein the negative electrode current collector is one of stainless steel, nickel, copper, iron, or graphite, and
        lithium metal pieces arranged spaced from each other on the surface of the negative electrode current collector;
    a separator disposed between the positive electrode and the negative electrode; and
    a nonaqueous electrolyte solution filled between the positive electrode and the negative electrode, the nonaqueous electrolyte solution having a lithium ion conductivity,
    wherein a base portion of the surface of the negative electrode current collector, which is not covered by the lithium metal pieces, allows a lithium metal to be deposited thereon as a negative electrode active material when the lithium secondary battery is in a charged state, and
    the lithium metal pieces are in direct contact with the separator both when the lithium secondary battery is in the charged state and when the lithium secondary battery is in a discharged state, and the lithium metal pieces secure a space, in which the lithium metal is deposited when the lithium secondary battery is in the charged state.

2. The lithium secondary battery according to claim 1, wherein there is no lithium metal on an imaginary line extending from a first end to a second end opposite to the first end of the surface of the negative electrode current collector and traversing the space between the lithium metal pieces.

3. The lithium secondary battery according to claim 2, wherein the negative electrode allows the nonaqueous electrolyte solution to communicate between the separator and the surface of the negative electrode current collector along the imaginary line.

4. The lithium secondary battery according to claim 1, wherein when the lithium metal pieces are viewed in a direction perpendicular to the surface of the negative electrode current collector, a distance between each adjacent two of the lithium metal pieces is larger than a maximum width of each of the lithium metal pieces.

5. The lithium secondary battery according to claim 1, wherein the lithium metal pieces are arranged in a two-dimensional manner on the surface of the negative electrode current collector.

6. The lithium secondary battery according to claim 5, wherein an arrangement of the lithium metal pieces has a first periodicity in a first direction and a second periodicity in a second direction different from the first direction.

7. The lithium secondary battery according to claim 6, wherein a first distance between adjacent two lithium metal pieces in the first direction is equal to a second distance between adjacent two lithium metal pieces in the second direction.

8. The lithium secondary battery according to claim 6, wherein the first direction is perpendicular to the second direction.

9. The lithium secondary battery according to claim 6, wherein the first direction is not perpendicular to the second direction.

10. The lithium secondary battery according to claim 6, wherein when the lithium metal pieces are viewed in a direction perpendicular to the surface of the negative electrode current collector, a first distance between adjacent two lithium metal pieces in the first direction is larger than a maximum width of each of the lithium metal pieces, and a second distance between adjacent two lithium metal pieces in the second direction is smaller than the first distance.

11. The lithium secondary battery according to claim 1, wherein when viewed in a direction perpendicular to the surface of the negative electrode current collector, the lithium metal pieces each have a round shape or an oval shape.

12. The lithium secondary battery according to claim 1, wherein the lithium metal pieces are arranged in a one-dimensional manner on the surface of the negative electrode current collector, and
a distance between each adjacent two lithium metal pieces in a first direction is larger than a width of each of the lithium metal pieces in the first direction.

13. The lithium secondary battery according to claim 12, wherein an arrangement of the lithium metal pieces has a periodicity in the first direction.

14. The lithium secondary battery according to claim 12, wherein when viewed in a direction perpendicular to the surface of the negative electrode current collector, the lithium metal pieces each have a strip shape.

15. The lithium secondary battery according to claim 1, wherein the negative electrode collector layer contains no lithium.

16. The lithium secondary battery according to claim 1, wherein the negative electrode further includes electrically conductive pieces, each of which is disposed between the negative electrode current collector and a corresponding one of the lithium metal pieces.

17. The lithium secondary battery according to claim 1, wherein a rate of the at least one area to an entire area of the surface of the negative electrode current collector is 80% to 98%.

18. The lithium secondary battery according to claim 1, wherein the thickness of each of the lithium metal pieces in a direction perpendicular to the surface of the negative electrode current collector is 15 µm to 120 µm.

* * * * *